United States Patent
Yeten et al.

(10) Patent No.: US 8,335,677 B2
(45) Date of Patent: Dec. 18, 2012

(54) METHOD FOR HISTORY MATCHING AND UNCERTAINTY QUANTIFICATION ASSISTED BY GLOBAL OPTIMIZATION TECHNIQUES UTILIZING PROXIES

(75) Inventors: Burak Yeten, San Ramon, CA (US); Alexandre Castellini, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 1122 days.

(21) Appl. No.: 11/848,348

(22) Filed: Aug. 31, 2007

(65) Prior Publication Data

US 2008/0077371 A1     Mar. 27, 2008

Related U.S. Application Data

(60) Provisional application No. 60/841,858, filed on Sep. 1, 2006.

(51) Int. Cl.
*G06G 7/48*     (2006.01)
(52) U.S. Cl. ......................................................... 703/10
(58) Field of Classification Search ...................... 703/10
See application file for complete search history.

(56) References Cited

U.S. PATENT DOCUMENTS

| | | | |
|---|---|---|---|
| 6,101,447 A | 8/2000 | Poe, Jr. | |
| 6,549,879 B1 | 4/2003 | Cullick et al. | |
| 6,810,322 B2 | 10/2004 | Lai | |
| 6,980,940 B1 | 12/2005 | Gurpinar et al. | |
| 7,032,689 B2 * | 4/2006 | Goldman et al. | 175/39 |
| 7,261,167 B2 * | 8/2007 | Goldman et al. | 175/39 |
| 7,357,196 B2 * | 4/2008 | Goldman et al. | 175/24 |
| 7,478,024 B2 * | 1/2009 | Gurpinar et al. | 703/10 |
| 7,725,302 B2 * | 5/2010 | Ayan et al. | 703/10 |
| 7,739,089 B2 * | 6/2010 | Gurpinar et al. | 703/10 |
| 2005/0015226 A1 * | 1/2005 | Le Ravalec-Dupin et al. | 703/2 |
| 2005/0038603 A1 | 2/2005 | Thomas et al. | |
| 2006/0069511 A1 | 3/2006 | Thambynayagam et al. | |
| 2007/0016389 A1 * | 1/2007 | Ozgen | 703/10 |
| 2007/0156377 A1 * | 7/2007 | Gurpinar et al. | 703/10 |
| 2009/0125288 A1 * | 5/2009 | Main et al. | 703/10 |

OTHER PUBLICATIONS

Satter, Abdus; Iqbal, Ghulam; Buchwalter, James L. Practical Enhanced Reservoir Engineering : Assisted with Simulation Software. Tulsa, OK, USA: PennWell Corporation, 1990. p. 653.

* cited by examiner

*Primary Examiner* — Kamini S Shah
*Assistant Examiner* — Juan Ochoa
(74) *Attorney, Agent, or Firm* — Craig R. Vander Ploeg; Christopher D. Northcutt; Richard J. Schulte

(57) ABSTRACT

A method for forecasting production from a hydrocarbon producing reservoir, the method includes defining an objective function and characteristics of a history-matched model of a reservoir and acceptable error E. At least one geological realization of the reservoir is created representing a probable geological setting. For each geological realization, a global optimization technique is used to perform history matching in a series of iterative steps to obtain acceptable models. Production of the reservoir is forecasted based upon simulation runs of the respective models.

36 Claims, 14 Drawing Sheets

ମETHOD FOR HISTORY MATCHING AND UNCERTAINTY QUANTIFICATION ASSISTED BY GLOBAL OPTIMIZATION TECHNIQUES UTILIZING PROXIES

RELATED APPLICATION

This nonprovisional application claims the benefit of co-pending, provisional patent application U.S. Ser. No. 60/841,858, filed on Sep. 1, 2006, which is hereby incorporated by reference in its entirety.

TECHNICAL FIELD

This invention relates generally to history matching and forecasting in the production of hydrocarbons from subterranean formations, and more particularly, to those methods which utilize proxies to assist in optimizing history matching efficiency.

BACKGROUND OF THE INVENTION

Ranges in production forecast provide critical information for reservoir management decisions. Well developed methodologies exist for handling subsurface uncertainties for new field developments. The task is more challenging for fields that have been produced for several years as all models need to be conditioned to available production data in order to deliver reliable predictions. The computing cost associated with the exhaustive search of models that reproduce historical data is in general prohibitive.

Mathematically speaking, the goal of any history-matching procedure is to find the minimum of an objective function that measures the misfit between actual and simulated data. Determining the appropriate set of parameters is usually a daunting task because of the high dimensionality of the problem parameters and the non-linear relationship between the parameters and the objective function. In some instances sampling strategies based on traditional or more elaborate experimental design techniques are sufficient to build accurate proxies on which multiple solutions to the history matching problem can be identified. If the constraints in time and computer nodes are very stringent, this is often one of the only practical solutions.

Initial efforts towards computer assisted history matching focused on the calculation of sensitivity of flow responses with respect to reservoir properties. The performance of such gradient based algorithms degrades with the size of the problem and strongly depends on the initial guess of the solution vector. The recent availability of affordable computer clusters has sparked a revival in the application of greedier techniques and rigorous frameworks have been proposed for a better assessment of uncertainty in production forecasts. Evolutionary Strategies have very attractive global convergence properties and take full advantage of the scalability introduced by computer clusters. In particular, Genetic Algorithms (GAs) have been successfully used as global search engines in a variety of optimization problems including optimization of well location and trajectory, development plan, cycling steam oil production and production data integration.

There is a need to increase the computational efficiency of history matching in methods employing proxies. The present invention addresses this need.

SUMMARY OF THE INVENTION

A method for forecasting production from a hydrocarbon producing reservoir includes defining an objective function and characteristics of a history-matched model of a reservoir and acceptable error E. At least one geological realization of the reservoir is created representing a probable geological setting. For each geological realization, a global optimization technique is used to perform history matching in a series of iterative steps to obtain acceptable models. Production of the reservoir is forecasted based upon simulation runs of the respective models.

The method can also include the step of collecting all acceptable models and applying clustering techniques to select representative models prior to forecasting the production of the reservoir.

In the method, the optimization technique can include the step of creating an initial population of parent models having discrete sets of parameters. The optimization technique can also include the step of running simulations on, and calculating errors E for, the parent models. The optimization technique can also include the step of creating a plurality of proxy surfaces based on the discrete set of parameters and errors E associated with the parent models. The optimization technique can further include the step of utilizing the proxy surface for at least one of selecting parent models from minimums of the proxy surfaces and utilizing the proxy surface as filters for selecting offspring models prepared from the parent models. The optimization technique can also include the step of selecting acceptable reservoir models from the offspring models.

The present invention includes in at least one embodiment a method for forecasting production from a hydrocarbon producing reservoir. An objection function, characteristics of a history-matched model of a reservoir and acceptable error E are defined. At least one geological realization of the reservoir representing a probable geological setting is created. For each geological realization, a global optimization technique is used to perform history matching in a series of iterative steps to obtain acceptable models. The optimization technique employs:

(i) creating an initial population of parent models having discrete sets of parameters;

(ii) running simulations on, and calculating errors E for, the parent models;

(iii) creating a plurality of proxy surfaces based on the discrete set of parameters and errors E associated with the parent models;

(iv) utilizing the plurality of proxy surfaces to either select potential parent models from minimums of the proxy surfaces and/or utilize the proxy surface as filters for selecting offspring models prepared from the parent models. Acceptable models are determined from the optimization. Finally, production from the reservoir is forecast utilizing simulation runs based on the acceptable models determined during the optimization. Clustering may be used to reduce the number acceptable models down to a fewer number representative reservoir models which will reduce computational efforts during forecasting. Genetic algorithms are preferably used to create offspring models from parent models. Exemplary techniques to create proxy surfaces include using a) kriging; b) splines and c) artificial neural network techniques.

It is an object of the present invention to provide a genetic algorithm applied to history matching coupled with the use proxy surfaces as filters and for selection of potential new reservoir models to enhance the efficiency of obtaining optimized reservoir models;

It is another object to use a plurality of proxies as filters for selecting reservoir model candidates wherein at least two of the proxies must pass the reservoir model before it is accepted as a good reservoir model;

It is another object to use a clustering technique to sample a diverse sample space without requiring large number of reservoir models to model parameter space.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

Embodiments of the present invention describe efficient methods that combines the strength of various techniques, including optimization algorithms, experimental design and non-linear response surfaces and clustering techniques. These methods are applied to a reservoir for which multiple history-matched models are obtained in a reasonable timeframe.

A preferred global optimization technique which is to be used for selecting history-matched models includes the use of Genetic Algorithms (GA's). GA's are stochastic search algorithms based on the mechanics of natural selection and genetics. They only use an objective function value to determine new search steps and do not require any gradient information. They can therefore be used when gradient information is not available or computationally prohibitive, or when traditional algorithms fail because of strong non-linearities in the search space. Due to their stochastic nature, GA's are also less likely to be trapped in local minima, a very important feature for complex history matching problems.

Genetic Algorithms work on a population of individuals (set of models) that are improving over time. A better model has a smaller objective function. An initial distribution of individuals can be created via space-filling sampling strategies for instance. It ensures the optimization starts with a highly diverse initial group increasing the optimal search of the parameter space. At each iteration, good solutions are combined to form even better ones. During the progression of the optimization, GAs apply probabilistic transition rules that mimic Darwinian natural selection processes like mutation and cross-over. If the solution stops improving for a predefined number of iterations, the optimization is said to have converged and the combinations of parameters obtained are deemed to be optimum.

The application of global optimization techniques to the problem of history-matching is often limited by the excessive simulation time of a single run in a real life environment. In an example case to be described below, a reservoir model is ideally built at a reasonably coarse scale to speed up the simulation time while ensuring a proper characterization of the geological settings and an appropriate capture of the flow behavior. In addition, a proxy surface for the misfit function is also constructed after each iteration of the GAs to accelerate the convergence of the process. Based on kriging and/or other proxies, a non-linear response surface serves a dual purpose. Minima can be quickly identified on the surface while unnecessary combinations of parameters leading to unacceptably high values of the misfit can be discarded, thus further reducing the need for costly evaluations.

Figure 1:
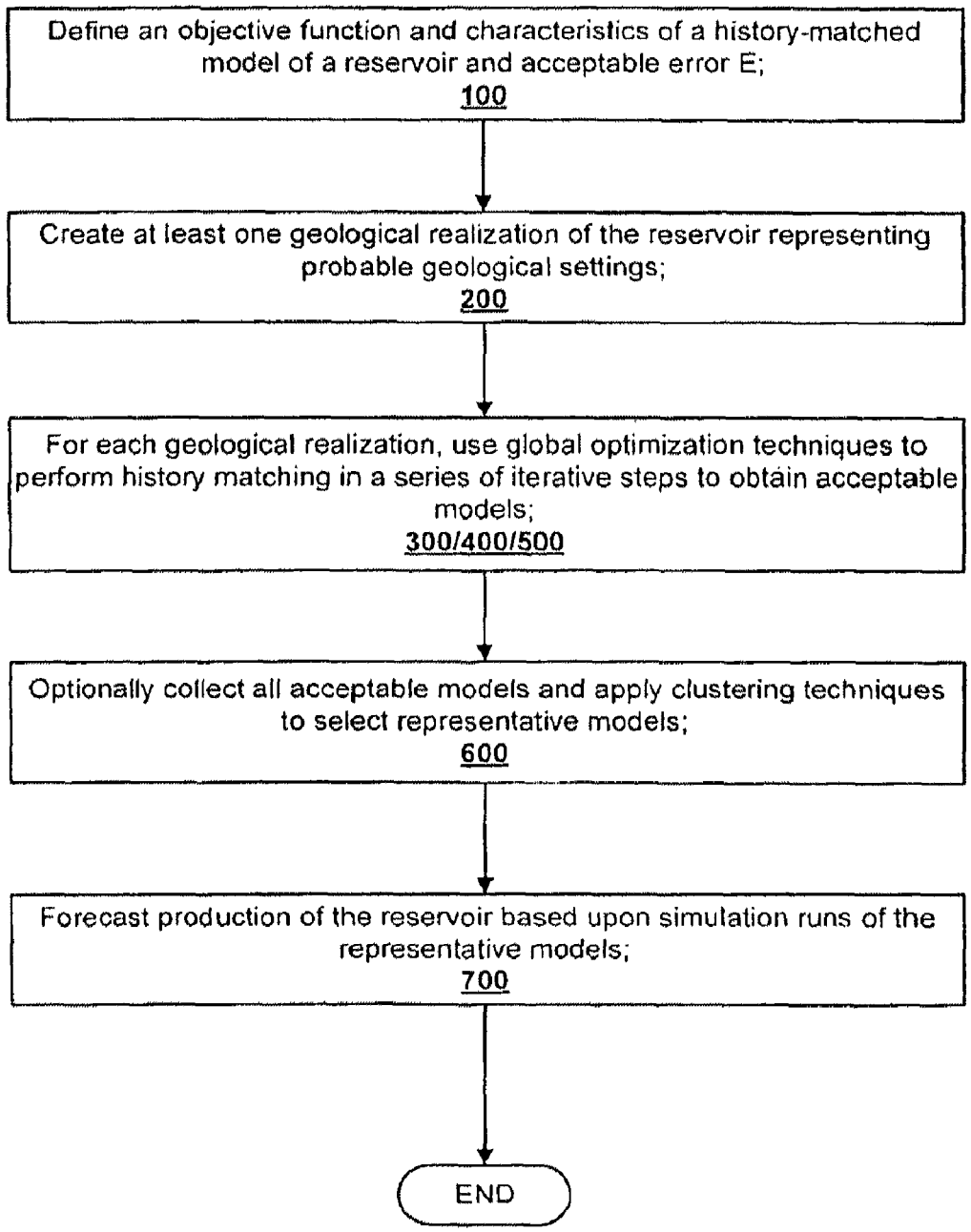
FIG. 1 is a flowchart of a first embodiment of an overall workflow made in accordance with the present invention.

FIG. 1 is a flowchart of overall steps taken to forecast production from a reservoir. FIGS. 2A-C and 3 show flowcharts describing in greater detail some of the general steps of FIG. 1.

An objective function, characteristics of a history-matched model of a reservoir and an acceptable error E is defined in step 100. Characteristics of a history-matched model may include input parameters and outputs or production variables to be observed. Typically the input parameters are not known with certainty. Accordingly, these parameters are defined in terms of a probable range. By way of example, and not limitation, examples of common parameters which are used in history matching include porosity, permeability distributions, net to gross thickness, relative permeability tables, PVT properties, etc. Examples of ranges of uncertain parameters might include average porosity ranging from 0.1 to 0.25. Another example is oil, water and gas residual saturations. Typically ranges in a reservoir might be from 0.15 to 0.4. These combinations of parameters and their ranges form a sample space for the reservoir simulation.

Outputs from the reservoir simulation, by way of example and not limitation, may include oil, gas, and water production, static and/or flowing bottomhole pressure, and well head pressure, and fluid saturation distributions. These outputs are recorded over time and serve as observed values which correlate to actual production.

With respect to the defined objective function, the difference between the observed data $d^{obs}$ and simulated data $d^{calc}$ defines the quality of the history match $E_{HM}$. A commonly used quadratic formulation is adopted in a preferred embodiment of this invention:

$$E_{HM}(\vec{\alpha}_{HM}) = \sum_{i=1}^{i=n_{obs}} w_i(d_i^{obs} - d_i^{calc})^2 \quad \text{(EQN. 1)}$$

where $\alpha_{HM}$ is the vector of parameters, $n_{obs}$ the number of observed data, and $w_i$ are the weights assigned to the production variables to be matched. In an example to be described in greater detail below, the focus is on the bottomhole pressure data derived from the permanent downhole gauges installed in wells of the reservoir. In this simplified nomenclature the weighs $w_i$ include the variance of the observed values and other normalization factors.

Preferably a number of geological realizations of the reservoir are created in step 200. The geological realizations represent probable geological settings. Typical geological realizations are designed to capture uncertainty in the parameters that make up the geological model, such as depths of top and bottom surfaces of the reservoir, faults, porosity, permeability and net to gross thickness distributions. Although one geological realization may be used with this invention, a number of geological realizations are preferred because then the uncertainty in the forecasts can be quantified.

For each of the geological realizations, global optimization techniques are used alternatively in steps 300 or 400 or 500 to perform history matching in a series of iterative steps to obtain acceptable models of the reservoir. That is, those optimized vectors of parameters which provide a reasonable match to actual production data will be accepted as models for use in forecasting future production from the reservoir.

Figure 2A:
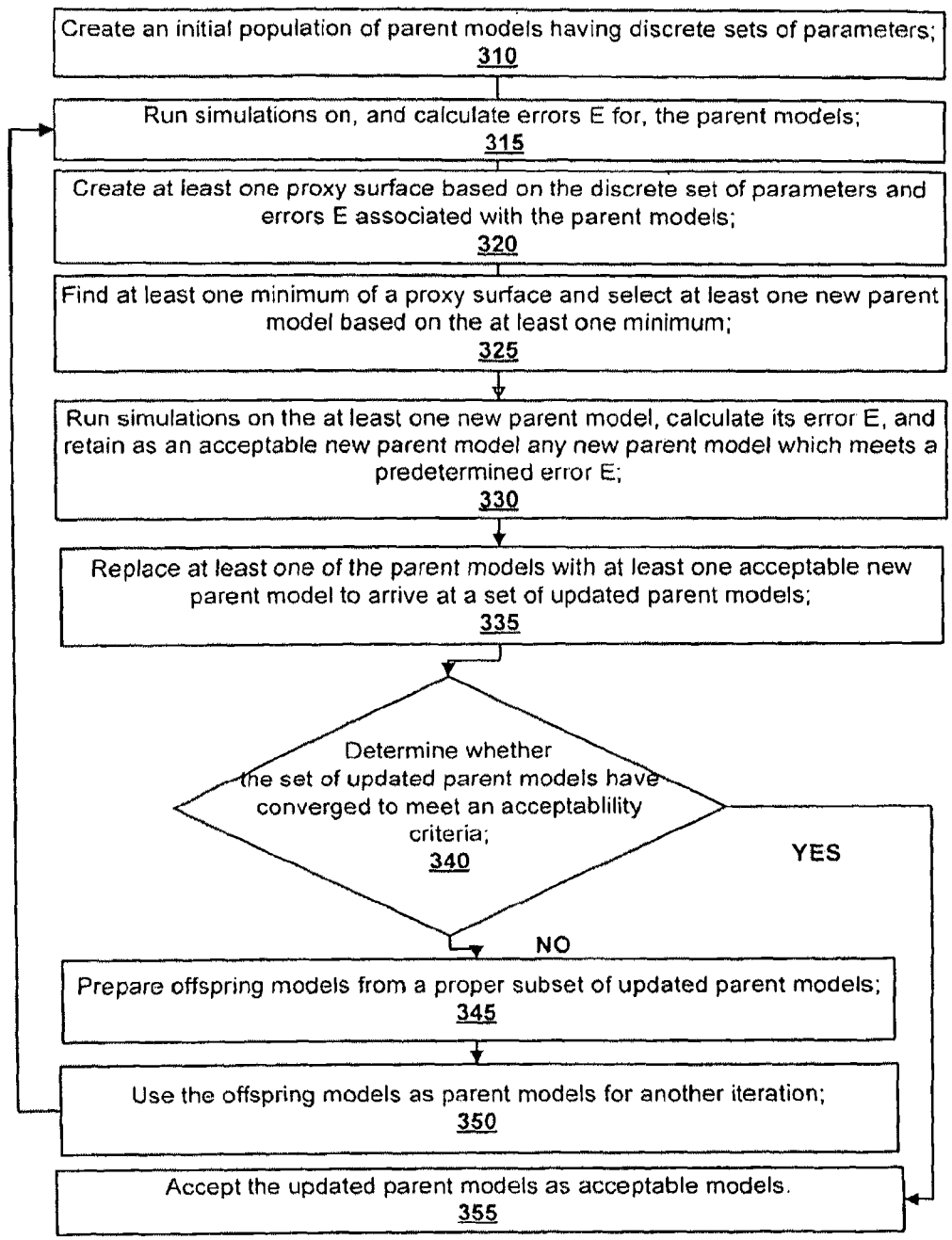
FIG. 2A is a flowchart in which the use of minimums selected from a proxy surface is used to enhance a global optimization of the selection of acceptable reservoir models.
Figure 2B:
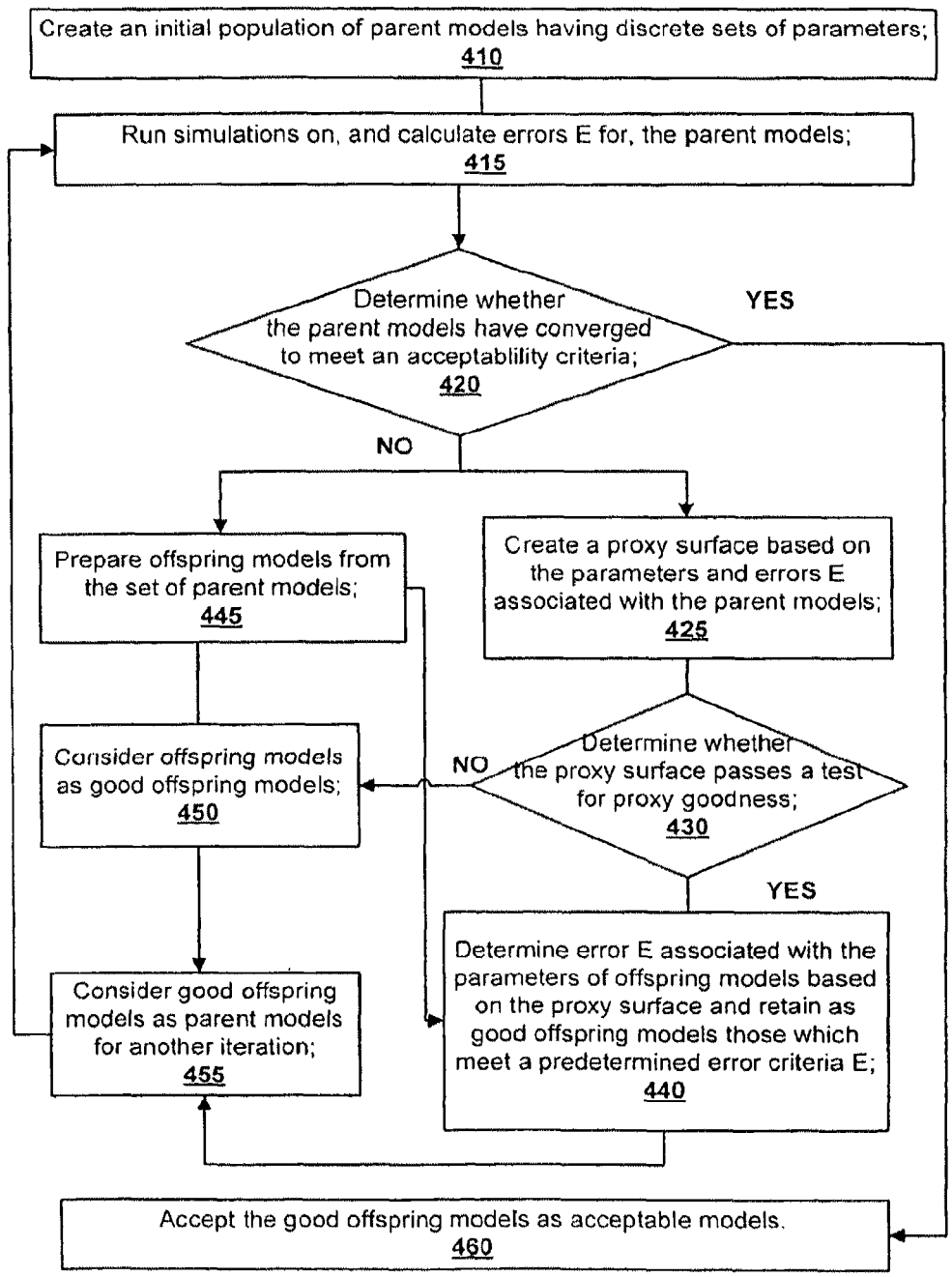
FIG. 2B is a flowchart in which one or more proxy surfaces are used to filter the selection of offspring models to enhance a global optimization of the selection of acceptable reservoir models.
Figure 2C:
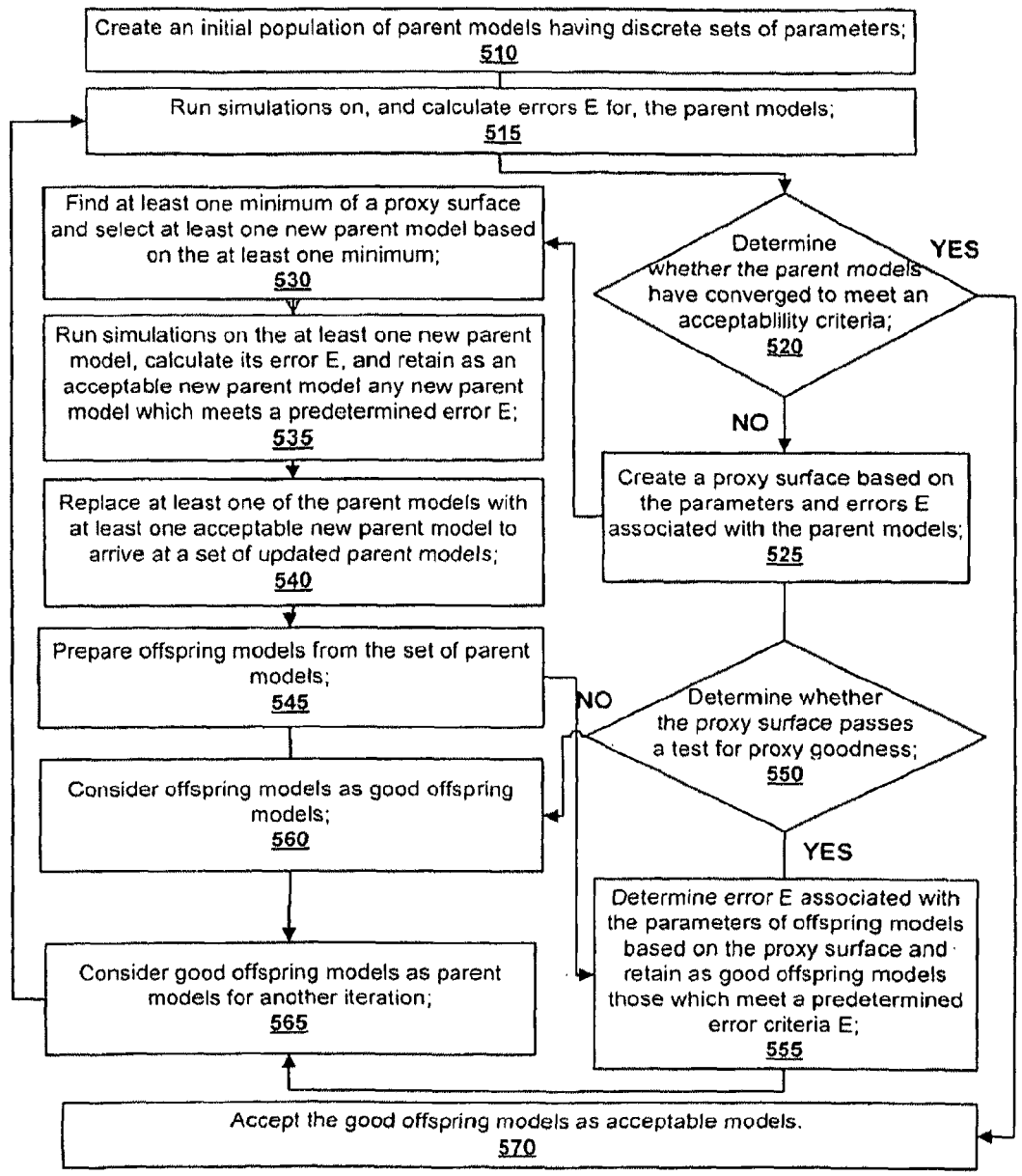
FIG. 2C is a flowchart in which minimums from one or more proxy surfaces are used to select potential good reservoir models, and further, in which the proxy surfaces are used to filter the selection of offspring models to enhance a global optimization of the selection of acceptable reservoir models.

These global optimization techniques preferably utilize proxies or proxy surfaces in their optimization techniques, although other global optimization techniques are also within the scope of this invention. FIGS. 2A, 2B and 2C describe in more detail the steps taken to perform this global optimization utilizing proxy surfaces and will be described later below.

After a number of acceptable models are collected through the use of optimization and history matching, preferably clustering techniques are used in step 600 to select representative models from the collection of acceptable models. According, all of the acceptable models need not be run in order to get a good prediction of the probably future output or production from the reservoir.

More specifically, a preferred clustering technique is to calculate distance between the acceptable models, group them with respect to the measure of similarity (i.e., distance) and ensure maximum diversity among the acceptable models by picking models from each group. Those skilled in the art of petroleum engineering and history matching will of course appreciate that other clustering techniques may be used and are within the scope of this invention.

After an optimal selection of acceptable models are made in step 600, production from the reservoir may be forecast based upon simulation runs based on the selection of acceptable models. The range of production forecasts provides valuable information about estimation of ultimate oil production, time to implement secondary recovery mechanism, time to upgrade surface facilities and identification of possible field operational practices to maximize the profits. The history matched models, or acceptable models, are deemed to be reliable to make forecasts and increases decision quality.

Referring now to FIG. 2A and overall step 300, an initial population of parent models having discrete sets of parameters are created in step 310. This initial population may be expressed in terms of vectors of the parameters. It is generally not feasible to evaluate all the possible combinations of the discrete parameters. Experimental designs are the methodology used in this preferred embodiment to select a subset of the exhaustive combinations. These designs provide maximum information with minimum cost (evaluations). The resulting analysis is assumed to cover all the possible combinations of the vector of parameters. Experimental designs exist in many different forms, here space filling designs are used as the preferred alternative, but other forms are within the scope of this invention.

After the initial population of parent models has been selected in step 310, simulation runs are made using each of the parent models in step 315. EQN. 1 above is then used to calculate an error E for each of these parent models based on calculated production values and observed values from actual production.

In step 320, at least one proxy surface is created based upon the vector of parameters and errors E associated with the parent models. In the most preferred embodiment of this invention, three proxy surfaces are generated and used. A first proxy surface is preferably created using kriging algorithm. Kriging algorithm is known as the best unbiased linear estimator and has been used frequently in mapping of the geological distributions, such as porosity and permeability. A second proxy surface is ideally created using splines. Finally, a third proxy surface is preferably established using back propagated artificial neural networks. Within the scope of this invention are using only a single proxy surface or using two or more proxy surfaces. By way of example and not limitation, those skilled in the art will appreciate that other techniques for creating proxy surfaces may also be used such as polynomials of any degrees and are also within the scope of this invention.

In step 325, these one or more generated proxy surfaces are examined and local minimums for errors E are located by using global optimization techniques. Preferable method is to use genetic algorithms, though the invention is not limited to this particular algorithm, and other gradient based algorithms such as conjugate-gradient algorithm or other stochastic algorithms such as simulated annealing can be used to locate the minima. The minima located on each proxy surface is simulated to verify its acceptability. The corresponding vectors of parameters associated these minimums are selected as potential candidates for being a new parent model. Simulations runs are performed on each of the new parent models in step 330. Also, the associate error for each new parent model is calculated using EQN. 1. Those new parent models which are within a predetermined error E, are retained as being acceptable new parents. Predetermined error E is preferably selected by checking the 65th percentile, which is increased in subsequent iterations, of the ranked population. The ranking is performed with respect to error calculated for each member of the population. Alternatively, error E may be determined by selecting a constant value. Other methods of determining predetermined error E are of course also within the scope of this invention.

In step 335, these one or more acceptable new parent models are then used to replace at least one or more of the original parent models. This replacement scheme assists in optimizing the models, since it drives the search of the algorithm towards the regions where other acceptable parents models can be found.

At this point, in the preferred embodiment, in step 340, the set of updated parent models is examined to see whether the set might have converged sufficiently that an acceptability criteria for the set of updated parent models is met. Alternatively, if a sufficient number of iterations of step 300 has occurred, then this iterative process may be terminated. Another preferred alternative in this invention is to check the progression of the minimum error. If the error is not decreased in some predefined number of iterations, the optimization is deemed to be converged. Another criteria to terminate the algorithm is to set a threshold value for E. When a predefined number of acceptable parents have an error value less than the threshold E, then the algorithm can be terminated.

In step 355, if the acceptability criterion is met, then this optimization of parent models of parameters is done and the updated parent models are accepted as being "acceptable models". This term refers to collection of history matched models.

Typically, the acceptability criterion is not met until several iterations of method 300 have been made. Accordingly, offspring models are prepared from the updated parent models. Most preferably, in step 345, a proper subset of the set of updated parent models is selected to be used to create the offspring model. A proper subset includes less than all of the members of the original set. In the most preferred embodiment of this invention, this selection of the proper subset is made by the rank of each individual parent model within the population. As aforementioned, the ranking is determined with respect to the error value of each parent model. By way of example, and not limitation, the selection can be performed in other alternative ways, such as by considering only the error value, E, instead of its rank.

Once the proper subset is selected, ideally a genetic algorithm is used to produce offspring. For example, if the set of updated parent models contains 10 parent models, the proper subset might include on 5 parent models. The genetic algorithm operates on these 5 parent models to produce 10 new offspring models. These 10 new offspring models can then be considered in step 350 as now being potential new parent models to be used in another iteration of this global optimization technique. Simulation runs are conducted on these offspring models, or now new parent models, as described in step 315. The process as described above is repeated until the set of updated parent models have converged to meet the acceptability criteria and a set of acceptable models for this geological realization is defined.

FIG. 2B shows an alternative scheme 400 for using one or more proxy surfaces to optimize history matching. In a manner similar to step 310, an initial population of parent models having discrete sets of parameters is created in step 410. Simulation runs are performed on these parent models and associated errors E calculated in step 415. At this point, in step 420, the parent models are checked to see whether they might satisfactorily meet predetermined acceptability criteria such that the parent models may be deemed as being acceptable models to be used in forecasting production. If the acceptability criteria is not met then further steps are taken to optimize the set of models to be selected as acceptable models for use with future production forecasting.

In step 425, at least one proxy surface is created based on the vector of parameters and errors E associated with the parent models. Again, as in step 300, in the preferred embodiment three proxy surfaces are generated using a) kriging; b) splines and c) artificial neural network techniques. Each of these proxy surfaces are then investigated in step 430 to see whether they pass a test for proxy goodness.

Figure 3:
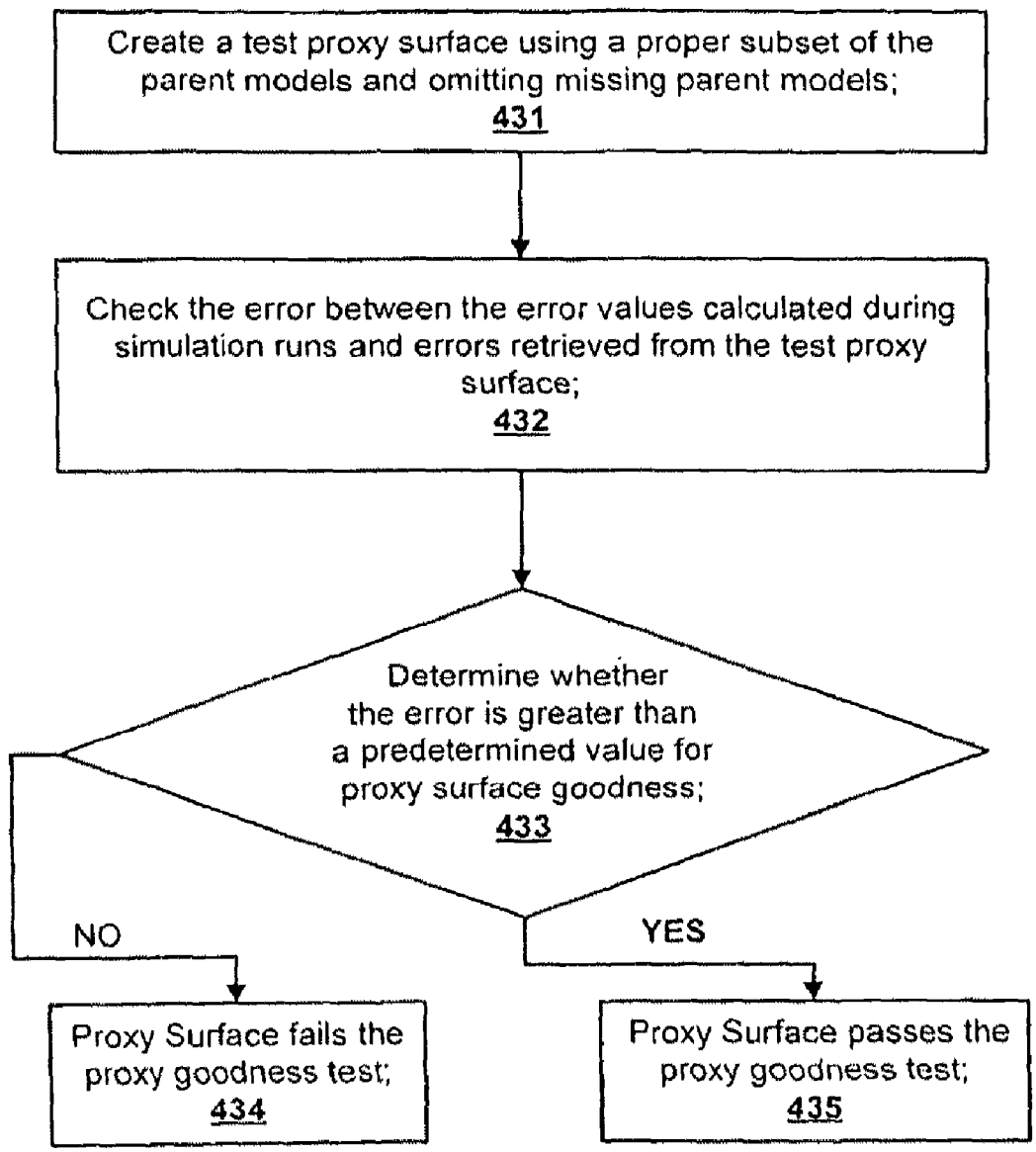
FIG. 3 is a flowchart showing one example of an embodiment for determining whether a proxy surface is deemed "good" in the process of FIG. 2B.

FIG. 3 shows one example of a preferred test for determining whether a proxy surface is deemed "good". In step 431, a test proxy surface is created using a proper subset of the parent models. By way of example, a number of parent models will have been run in step 415 and associated errors E calculated. If the number of parent models is 100, then possibly the test proxy will be created from 90 randomly selected parent models. The "missing" 10 parent models will then have their errors E, calculated in step 415, evaluated against the error values of the test proxy surface. In step 432, the differences between the calculated errors from the runs of the missing parent models and the associated error retrieved from the test proxy surface are evaluated to determine the "goodness" of the original proxy surface created in step 425. More particularly, preferred calculations are made in step 433 to determine whether the proxy surface fails (step 434) or passes (step 435) this goodness test and include 1) sum of ($E_{calc} - E_{test\ proxy}$); 2) correlation coefficients; and 3) rank correlation coefficients are computed to establish whether the original proxy surface is to be considered meeting the "goodness" test.

Of course, other test procedures can also be used to establish whether an original proxy surface of step 425 should be considered of sufficient quality that that proxy surface should serve as a filter for later selecting good offspring models. These other test procedures for goodness of proxy surface are also within the scope of this invention.

Assuming one or more of the original proxy surfaces of step 425 passes the goodness test, then the passing proxy surfaces will be used as filters for selecting good offspring models. In the preferred embodiment of step 400, the offspring models must pass the error criteria for more than one, and most preferably, all of the proxy surfaces in order to be selected as good offspring. Assuming all three of the proxies are good, then an offspring model should be able to meet the criteria of most, if not all, of the proxy surfaces before being selected as good offspring models. These offspring models are created in step 440 utilizing a selected set of the parent models, preferably in the manner described previously. In step 445, errors associated with these offspring models are selected from proxy surfaces passing the good test. If the error for a particular offspring model exceeds a predetermined error criterion, then the offspring model is disregarded. However, if an offspring model is within the predetermined error criterion, this offspring model is retained as a "good" offspring model in step 455.

Alternatively, if a proxy surface does not pass the goodness test, then the offspring models prepared in step 440 are assumed to be good offspring models in step 450. As these offspring models were generated using Genetic Algorithms, the offspring models will inherently improve in quality. However, with the use of good proxy surfaces as filters, this improvement in quality will converge more quickly by reducing the number of simulations required for convergence. These good offspring models in step 455 are then considered as parent models for another iteration of step 400. Again, this iterative procedure of step 400 will continue until the acceptability criterion is met in step 460. The parent models at this time will then be considered as acceptable models for future use in forecasting.

FIG. 2C shows step 500 which utilizes a combination of the steps from general optimization steps 300 and 400. Optimized parent models are selected using minimums from generated proxy surfaces and the parent models meeting certain thresholds will be used to replace parent models which are not deemed to be as good. These optimized or updated set of parent models are then used to generate offspring models. The proxy surfaces are again tested to see if they would serve as good filters. Good offspring models are selected using the good proxy surfaces, i.e., these offspring models have errors which fall below some selected threshold of errors from the proxy surfaces. Steps 510-570 track similar steps described previously with respect to steps 300 and 400.

The above optimization procedure for selecting acceptable models for using in forecasting is continued until all of the desired geological realizations have been evaluated. In step 600, these acceptable models are collected. Clustering techniques are used select models which are representative of the overall test space. These selected models are then run to produce a range of output production values. This range will assist planners in evaluating the uncertainty of potential future production from the reservoir or field in step 700.

Example

The following example was performed for an offshore gas reservoir. A short list of 5 major geological parameters, including Gross Rock Volume and porosity distributions in the two main accumulations of the field L and R, was the basis for the generation of a suite of subsurface model realizations. A Central Composite design was deemed appropriate as it combines the various geological parameters at 3 different levels. A total of 27 realizations were generated. An additional set of 15 parameters and associated ranges were identified. They include intra-reservoir baffles, saddle permeability, relative permeability curves, saturation distribution, fracture distribution and aquifer strength and properties.

For each of the 27 realizations, the global optimization routine guides the search towards history-matched models via the investigation of multiple combinations of the 15 parameters. Some geological realizations may provide many acceptable models while others show little minimization of the misfit function. When all realizations are investigated, the population of acceptable matches can be analyzed. Clustering techniques filter out models that are too similar, ensuring a diverse set of models is selected to capture uncertainty in predictions and reserves estimates. The workflow used in this particular embodiment to provide the particular results depicted in the FIGS. can be summarized in the following steps:

1. Define the objective function and the characteristics of a history-matched model. Any model that falls within the error band around measured data is regarded as acceptable.
2. Within an Experimental Design framework, build multiple geological realizations of the reservoir representing all probable geological settings.
3. For each realization, use global optimization techniques to perform history-matching in a series of iterative steps:
   a. Create an initial population of models with a space-filling design for a better initial coverage of the parameter space. Evaluate fitness of the models. This corresponds to the objective function evaluation.
   b. The GAs select the models based on their ranks determined by the fitness value to apply operators like crossover and mutation for reproduction.
   c. All simulation results are then used to construct a kriging proxy. Finding the minimum on the surface is fast since the function evaluations are cheap. An actual simulation is performed at the minimum on the surface. If the fitness is indeed improved, the model is added to the population.
   d. The kriging surface is tested for its ability to predict actual simulation runs. If it passes the test, the surface is used as a filter for the next population of models generated by the GAs. Combinations that produce higher than acceptable proxy fitness are rejected without going through simulation.
4. Collect all acceptable matches and apply clustering techniques. A measure of distance between models is computed and similar individuals are grouped together. Final models are picked from each group to ensure maximum diversity.
5. Prediction runs can be obtained from one or more development plans for each selected model. Statistics for reserves and other future production parameters are derived.

In this study GA's are selected as the main optimization tool. Surrogates of the objective function are constructed to minimize the number of costly evaluations with the fluid flow simulator. The GA's proved efficient in addressing the non-uniqueness of the history matching problem, allowing a fast estimation of ranges in production forecasts for the offshore gas condensate field.

Field Case Problem Description

The Gas-Condensate field is a Tertiary Carbonate build-up that is situated offshore, in the below 800-1200 m of water. Available subsurface data include a high resolution 3D seismic survey, live production wells and six exploration/appraisal wells with wireline and borehole image data, including spot core in selected wells, pressure and well test data.

Figure 4:
FIG. 4 shows a reservoir model of a gas condensate reservoir.

The field consists of two main accumulations separated by a saddle, as seen in FIG. 4. The reservoir comprises an Oligocene to early Miocene reefal carbonate build-up with highly variable reservoir quality. Both the steep flanked L pinnacle build-up and the western flank of R appear to be tight with poor porosity (<10%). The main R build-up which has all the existing producers has good reservoir quality with porosities ranging from 20 to 30% and moderate permeabilities (average 50 mD). Maximum gas column is some 650 m in L and averages some 450 m in R.

Five production wells on production for several years have been completed in the R accumulation. There were no production wells in L. Good continuous downhole pressure data exists for the R Field based on permanent downhole pressure gauges installed in each completion string. These gauges have provided valuable pressure data for the management of the reservoir. The overall field reservoir pressure decline is around 450 psi. Both P/Z and Havlena-Odeh analyses have been carried out for the field indicating that R has a weak aquifer and/or L is providing pressure support to R through the L-R saddle.

Results

The five producing gas wells have been on production since 2001. Permanent downhole gauges were installed in each completion string, and have been providing invaluable pressure data for the management of the reservoir. The objective function includes observed bottomhole pressure for each well. Due to the quality of the observed data, a relatively small error band around existing data defines the threshold within which simulation models are accepted as good matches.

Following an experimental design scheme, the five major geological variables were combined to produce multiple realizations of the reservoir. The realization in FIG. 4 shows the aquifer and the two main accumulations L and R separated by a saddle. There is not much data to characterize the connectivity between L and R and the properties of the uncertain saddle area are expected to be significant in terms of Gas Initially In Place (GIIP), Reserves estimation and future development plan.

Figure 5:
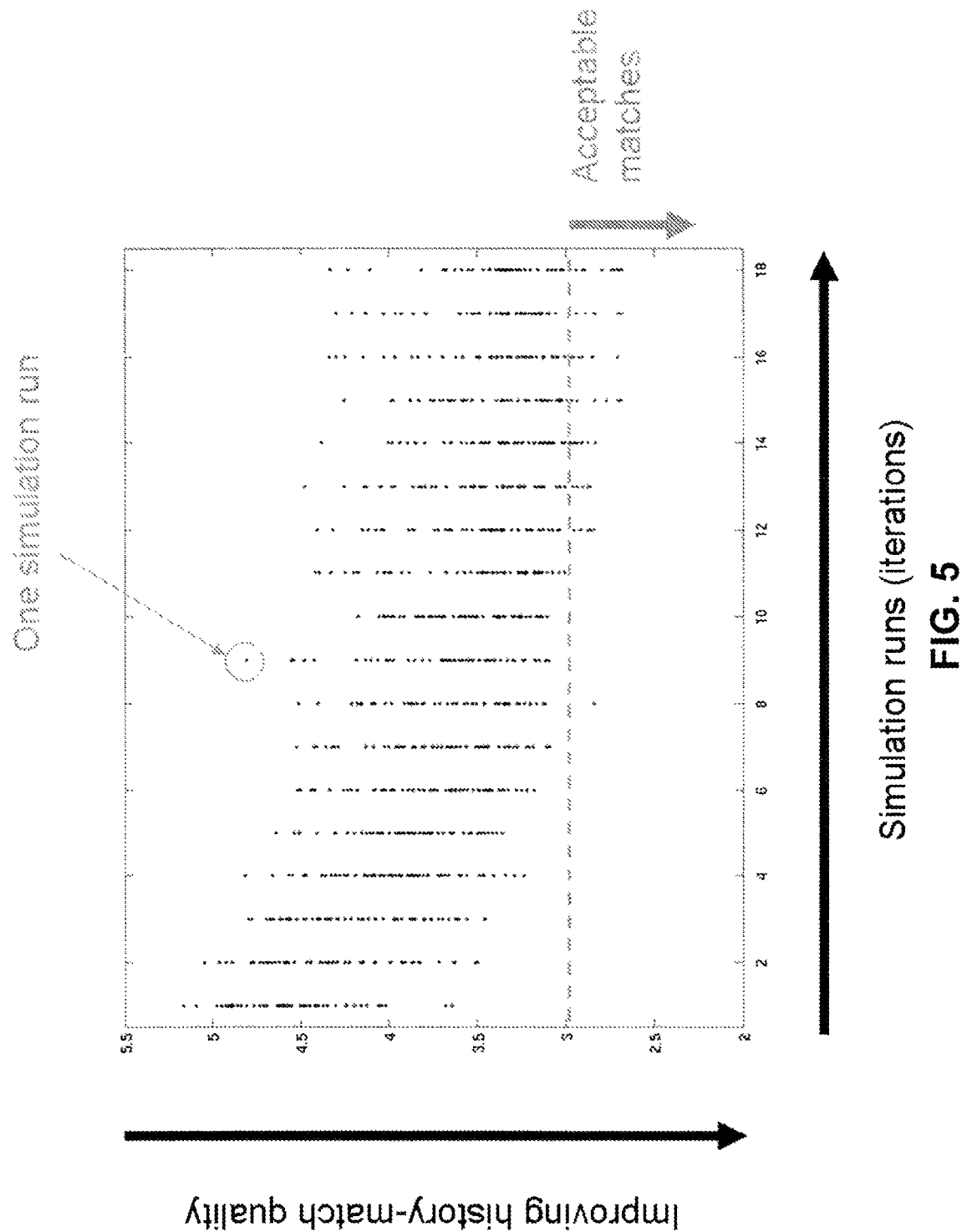
FIG. 5 illustrates a graph showing a Genetic Algorithm at work optimizing choices of reservoir models.
Figure 6:
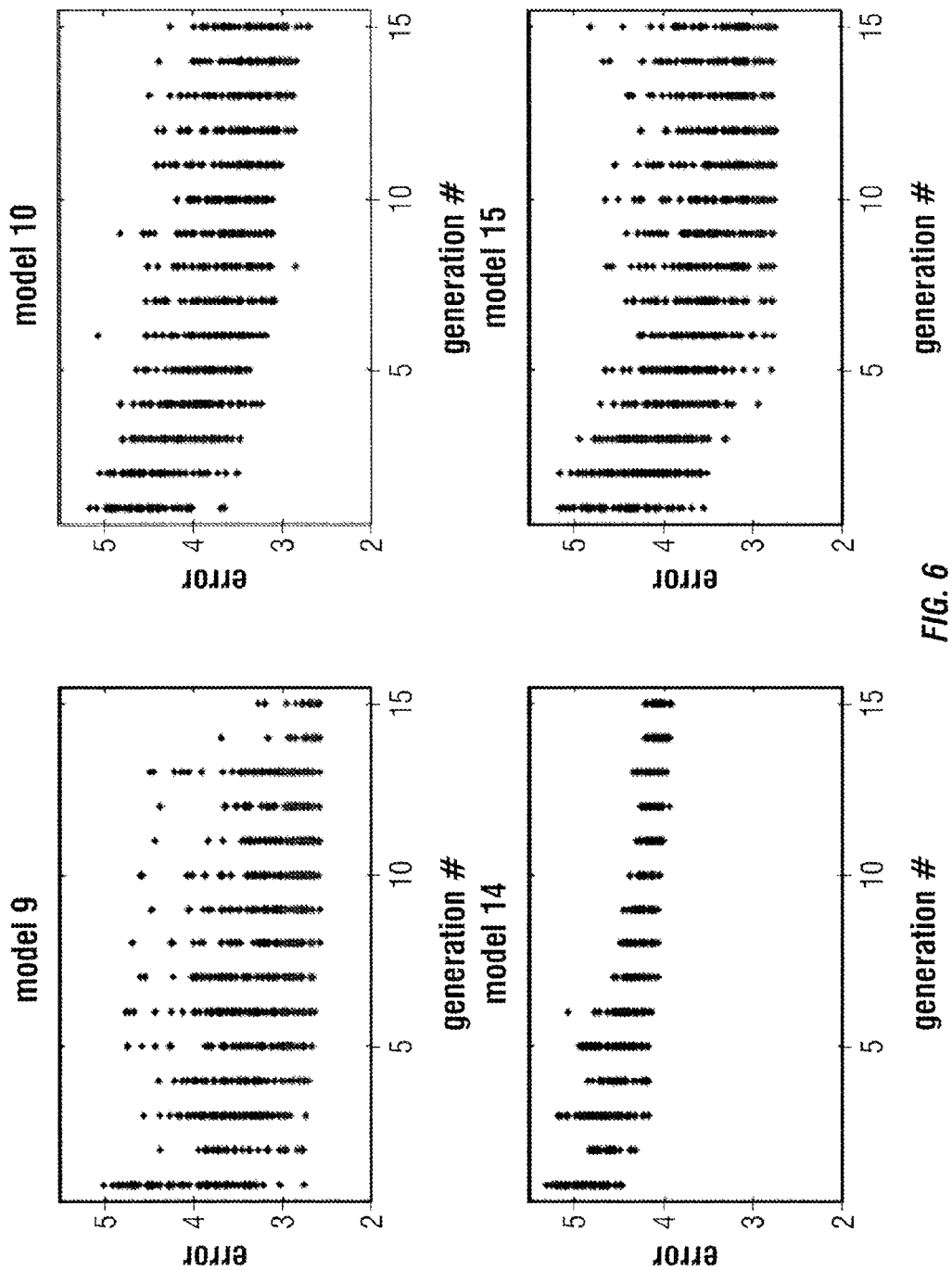
FIG. 6 is shows four examples of the diversity of optimization patterns for selected realizations.

For each realization, the optimization strategy uses GA's to iteratively look for acceptable matches. The starting point is a collection of 80 individuals created by a space filling design to ensure high diversity in the initial population. The example of FIG. 5 shows the improvement in the fitness of the models investigated when a new population is created. Each dot in the figure represents an actual simulation run. After 8 iterations, one simulation run falls below the threshold fixed previously. After 18 iterations, dozens of good matches are obtained. The procedure can be repeated for the other realizations. Different behaviors are observed in the 4 selected realizations of FIG. 6. Some geological representations of the reservoir are likely to provide many acceptable models (e.g. #9) while others exhibit a very poor match independently of the combination of parameters considered (e.g. #14). This provides critical information about the probable depositional environment.

A non-linear response surface, surrogate of the objective function, is updated at each iteration. If the proxy is reliable, it is used to screen out unacceptable combinations of parameters without the need of an expensive evaluation with the simulator. In this study, depending on the realization considered, between 10% and 50% of runs were filtered, saving a considerable amount of time. With a small-size computer cluster of 20 nodes, it took a few weeks to evaluate 27 realizations for a total of approximately 10,000 simulations. It would be completed in a matter of days with a current medium-size computer cluster of 256 nodes.

Figure 7:
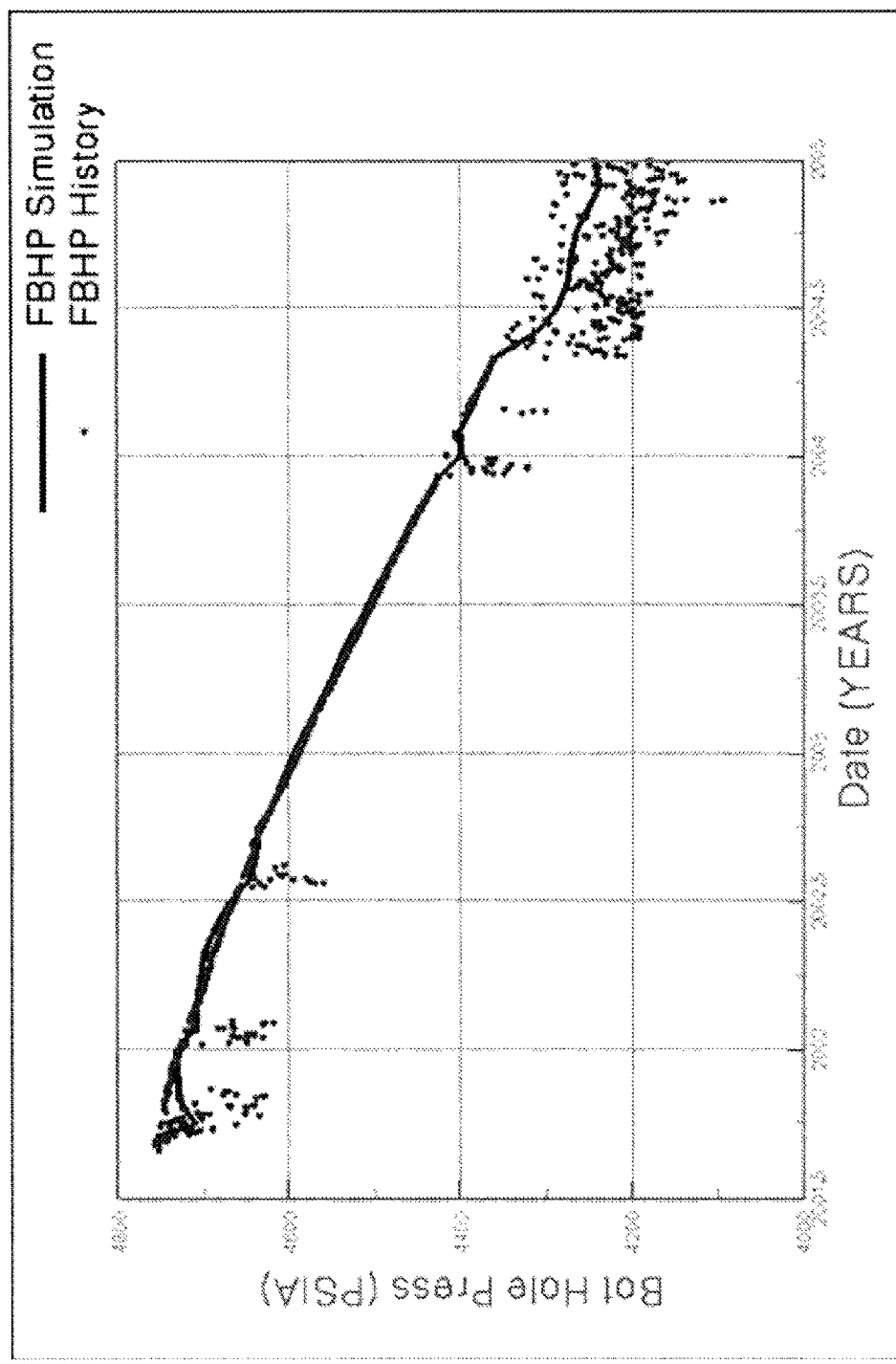
FIG. 7 show a graph of bottom hole pressure match for a selected well.
Figure 8:
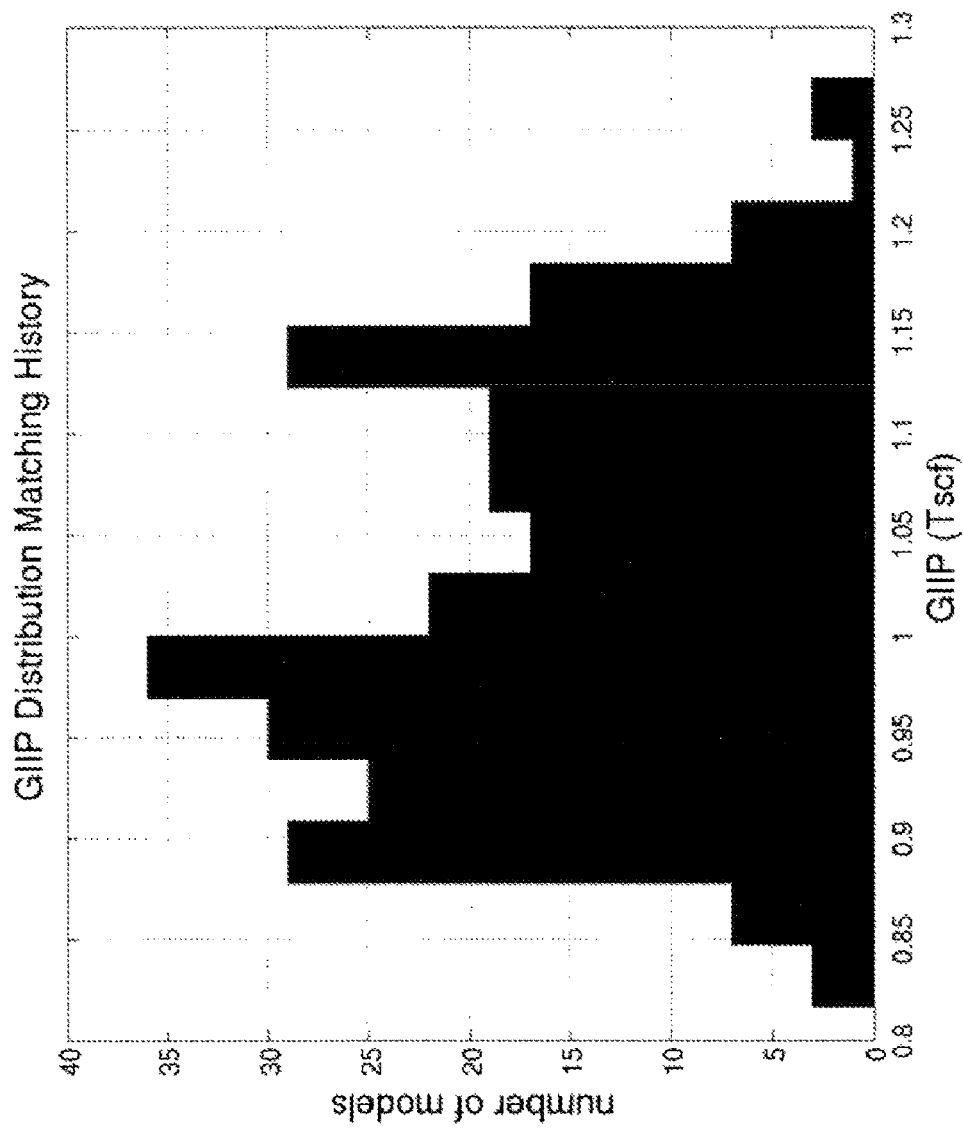
FIG. 8 shows a histogram of Gas In Place distributions after history-matching.
Figure 9:
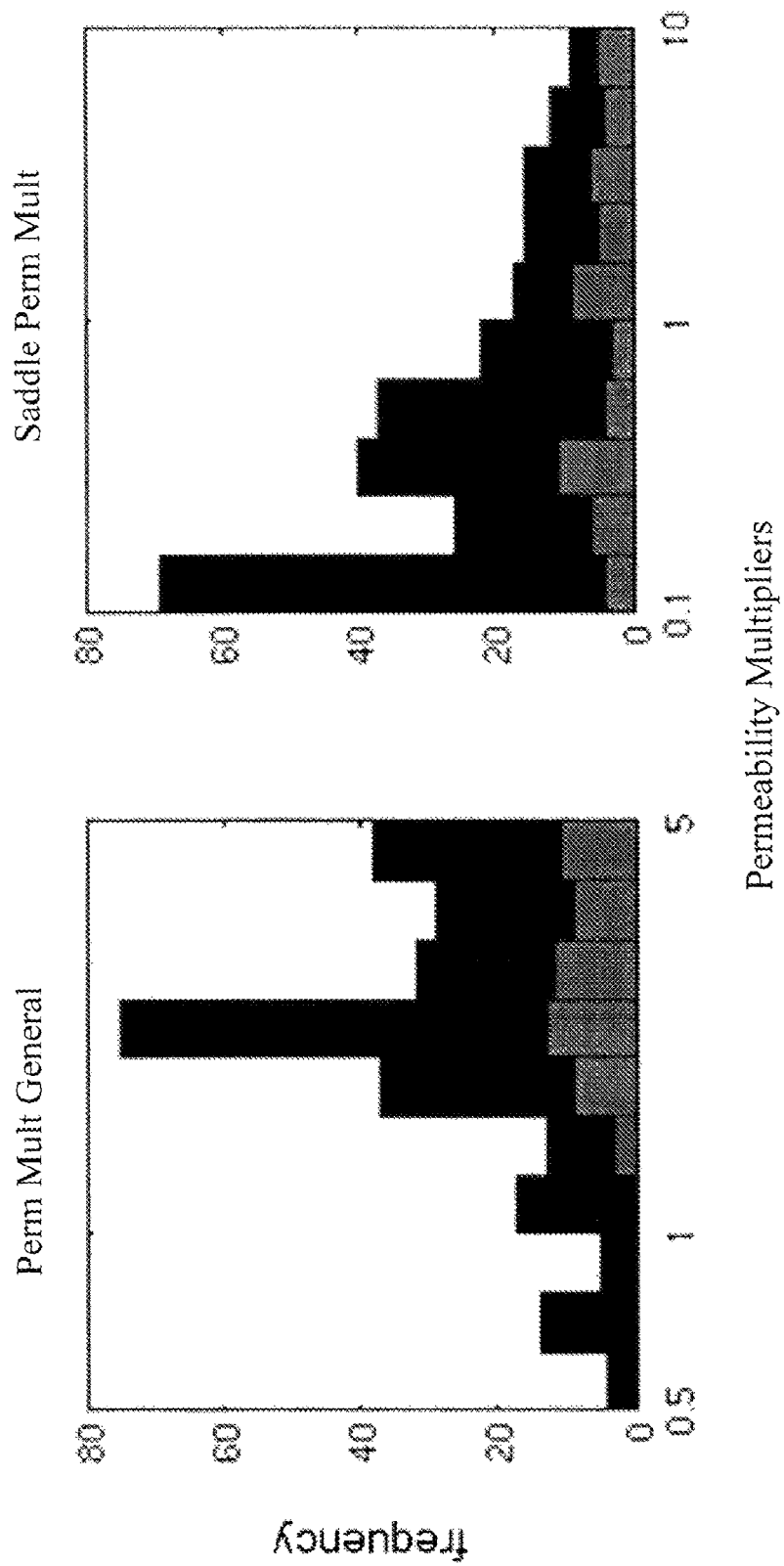
FIG. 9 shows a pair of histograms illustrating selected parameter distributions after history-matching.

The history-matching process produced hundreds of acceptable models. However, some might have very similar characteristics that will lead to similar predictions. To ensure selected models are as diverse as possible, cluster analysis is performed on the data set of acceptable cases. Based on the Euclidean distance, the proximity of objects to each other is determined and groups of similar models are formed. The final set is composed of individuals picked from every cluster. The bottomhole pressure match for one well is presented in FIG. 7. Similar high quality results were obtained for the other producing wells. The normalized Gas Initially In Place distribution is depicted in FIG. 8 for approximately 200 acceptable models. The range is about ⅔ the initial one covered by the 27 realizations. To verify that the optimization method has scanned large part of the search space, the spread of parameter values that have been selected during the process may be investigated. Two variables corresponding to a global permeability multiplier and a permeability multiplier applied locally to the saddle area are presented in FIG. 9. Although the communication between L and R is more likely to be poor, some models indicate a potentially high connectivity, which has significant implications in terms of preferential location for the next drilling campaign. Pressure data collected in the L accumulation would provide invaluable information to mitigate this major uncertainty.

Figure 10:
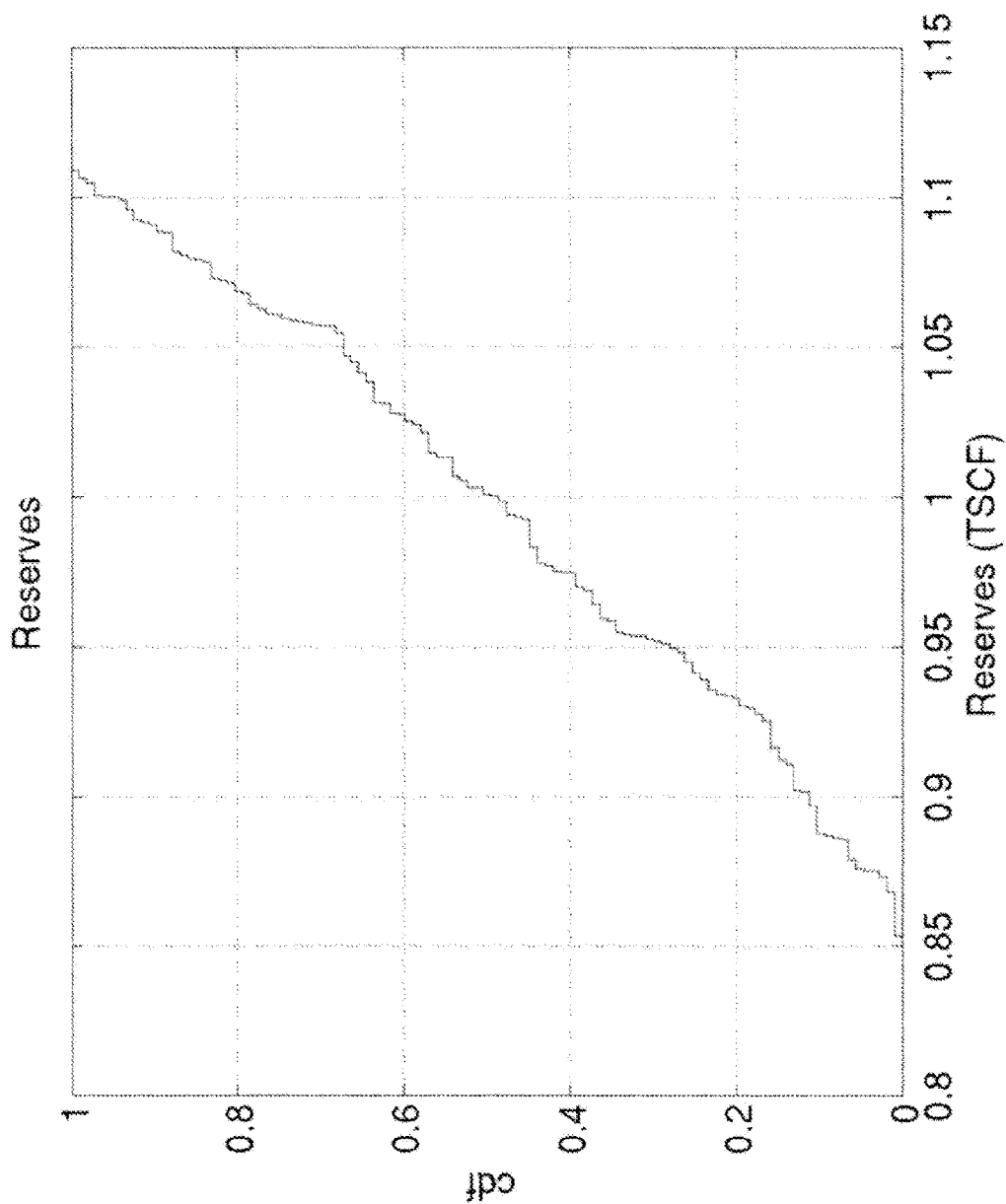
FIG. 10 shows a graph of cumulative distribution of reservoirs.
Figure 11:
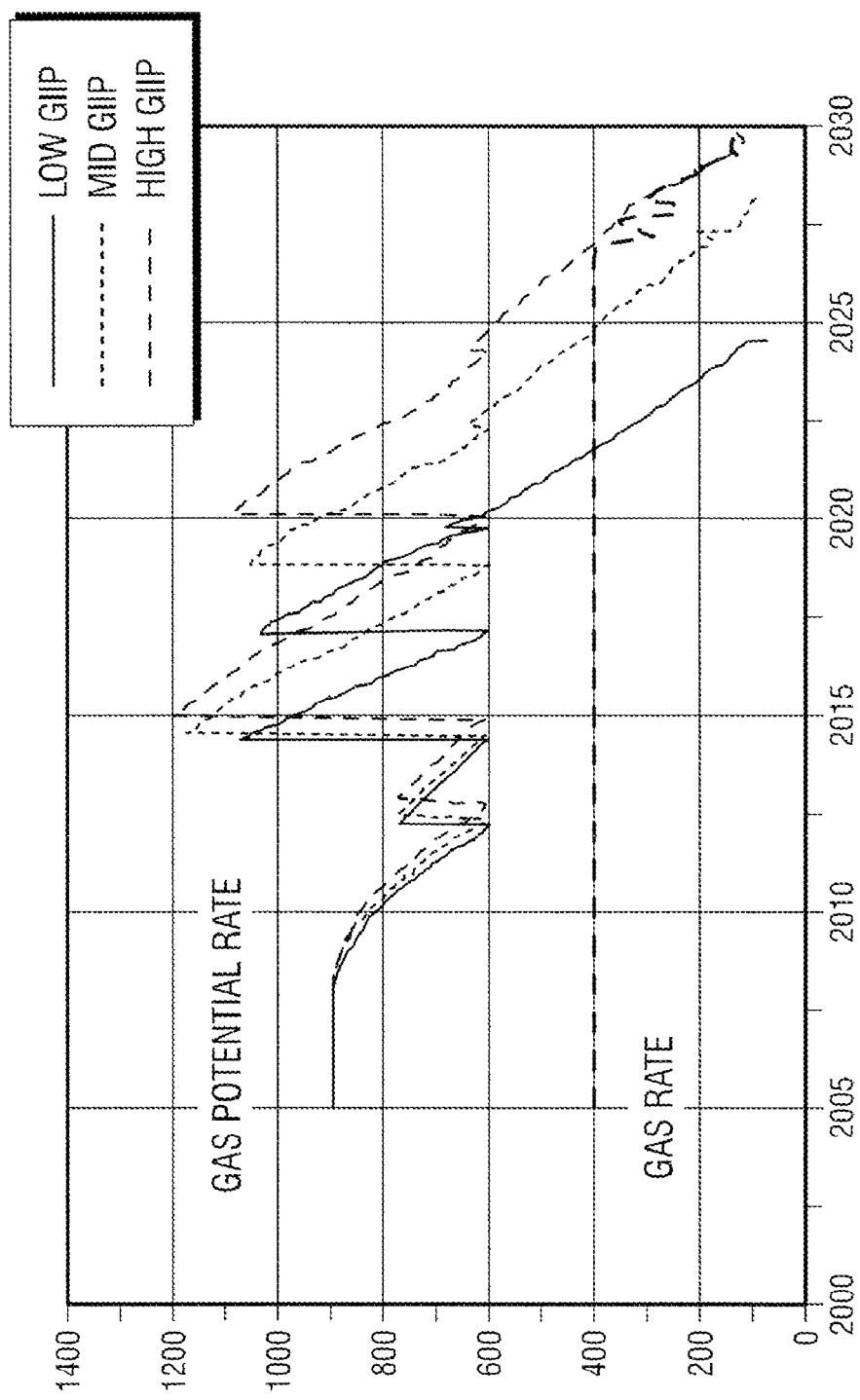
FIG. 11 show a graph of predictions of gas rate profiles for three representative models.
Figure 12:
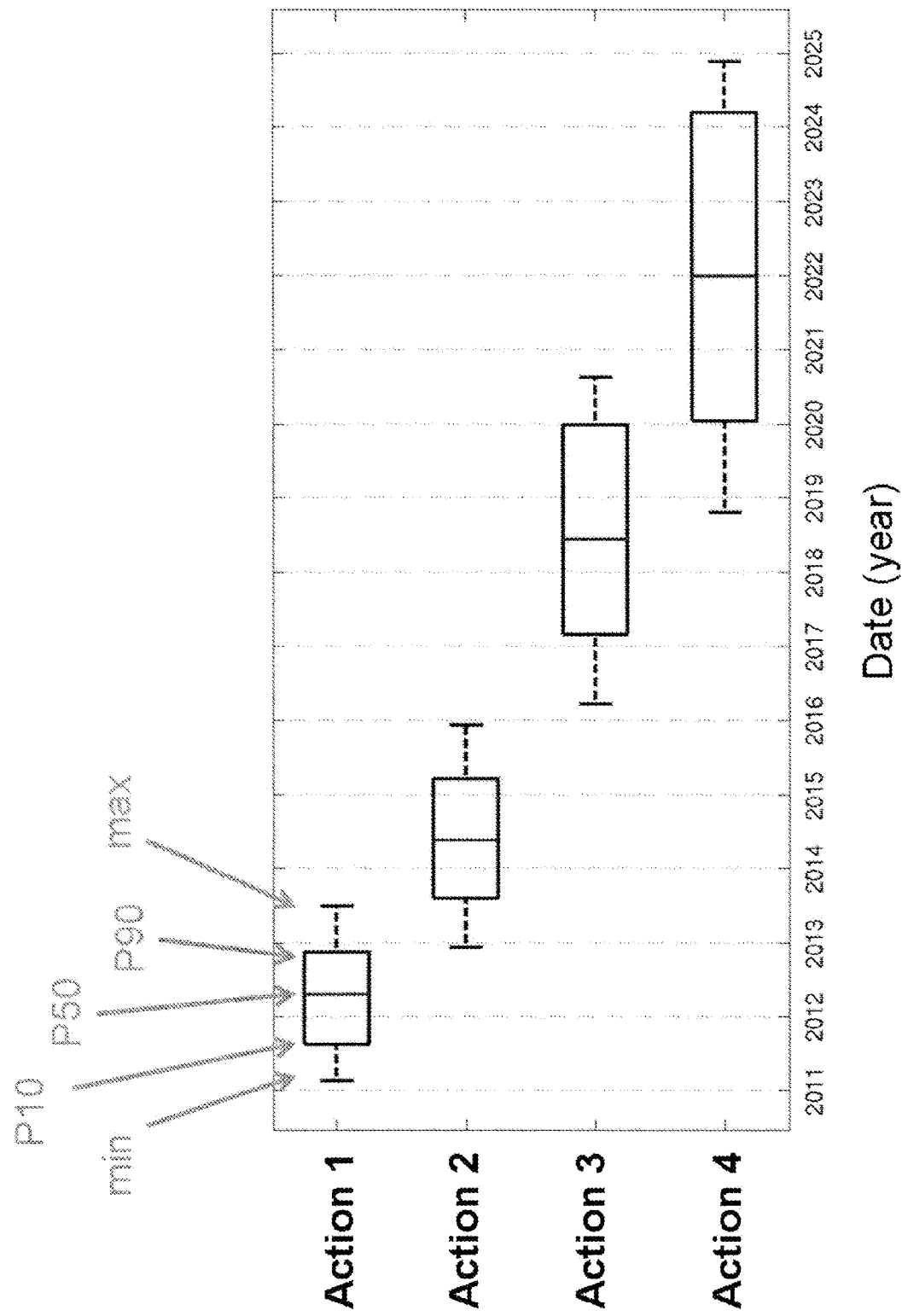
FIG. 12 illustrates a chart showing the affects of uncertainty on surface engineering actions.

The production strategy for the field is guided by the surface facilities and the decision to ensure extra capacity is available throughout the life of the field. To prevent the gas potential rate to drop below a predefined threshold, surface engineering actions are triggered and involve debottlenecking, drilling of new wells, depletion completion and introduction of an additional flow line. When there is no energy in the system left, the gas rate decreases until it reaches the minimum economic limit. The acceptable models collected in the previous step provide estimates of the reserves. The normalized cumulative distribution function is shown in FIG. 10. Profiles of the field production forecast of various models are depicted in FIG. 11, highlighting the impact on timing of development activities. Uncertainty in the timing of the four activities is quantified in FIG. 12, which is critical for planning purposes.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for forecasting production from a hydrocarbon producing reservoir, the method comprising: (a) defining an objective function, characteristics of a history-matched model of a reservoir and acceptable error E; (b) creating at least one geological realization of the reservoir representing a probable geological setting using the characteristics of the history-matched model of the reservoir; (c) for each geological realization, using a global optimization technique associated with the objective function to perform history matching by determining the difference between observed data obtained from the reservoir and simulated data in a series of iterative steps to obtain back propagated artificial neural networks acceptable models that are within acceptable error E, the global optimization technique comprising: (i) creating an initial population of parent models having discrete sets of parameters; and (ii) running simulations on, and calculating errors E for, the parent models; and (d) forecasting production of the reservoir based upon simulation runs of the acceptable models.

2. The method of claim 1, further comprising the step of collecting all acceptable models and applying clustering techniques to select representative models prior to step (d).

3. The method of claim 1, wherein the global optimization technique of step (c) further comprises: (iii) creating a plurality of proxy surfaces based on the discrete sets of parameters and errors E associated with the parent models; and (iv) utilizing the plurality of proxy surfaces for at least one of: (1) selecting parent models from minimums of the proxy surfaces; and (2) utilizing the proxy surfaces as filters for selecting offspring models prepared from the parent models and selecting acceptable reservoir models from the offspring models.

4. The method of claim 1, wherein the global optimization technique of step (c) further comprises: (vii) determining whether the parent models have converged to a predetermined acceptability criteria.

5. The method of claim 4, further comprising accepting the parent models as acceptable models when the parent models have converged to meet the predetermined acceptability criteria.

6. The method of claim 4, wherein when the parent models have not converged to meet the predetermined acceptability criteria, step (c) further comprises: creating a proxy surface based upon the parameters and errors E associated with the parent models; preparing a set of offspring models from the parent models; and determining whether the proxy surface passes a test for proxy goodness according to predetermined criteria.

7. The method of claim 6, wherein when the proxy surface fails to pass the test for proxy goodness according to predetermined criteria, step (c) further comprises repeating steps (ii)-(iii) while substituting the offspring models for the parent models.

8. The method of claim 6, wherein when the proxy surface passes the test for proxy goodness according to predetermined criteria, step (c) further comprises:
determining an offspring error E associated with the offspring models and retaining offspring models which satisfy a predetermined error criteria $E_c$; and
repeating steps (ii)-(iii) while substituting the retained offspring models for the parent models.

9. The method of claim 6, wherein the step of determining whether the proxy surface passes the test for proxy goodness according to predetermined criteria, further comprises: creating a test proxy surface using a proper subset of the parent models and omitting missing parent models and calculating proxy error Ep values associated with the proxy surface; and checking for a difference between the calculated error E values during simulation run of step (ii) and the proxy error Ep values; wherein the proxy surface fails the proxy goodness test when the difference is greater than a predetermined value, and the proxy surface passes the proxy goodness test when the difference is less than the predetermined value.

10. The method of claim 1, wherein the global optimization technique of step (c) further comprises: (iii) creating a proxy surface based upon the discrete set sets of parameters and the calculated errors E; (iv) selecting a new parent model based upon the proxy surface; (v) running simulations on the new parent model and calculating a parent model error EPM; (vi) if the new parent model is within a predetermined error E, then updating the initial population of parent models with the new parent model for use in step (vii), if the new parent model is not within the predetermined error E, then retaining the initial population of parent models for use in step (vii); and (vii) determining whether the initial population of parent models or the updated population of parent models with the new parent model from step (vi) converge to meet a predetermined acceptability criteria.

11. The method of claim 10, wherein in step (iii), the proxy surface is created using a Kriging algorithm.

12. The method of claim 10, wherein in step (iii), the proxy surface is created using splines.

13. The method of claim 10, wherein in step (iii), the proxy surface is created using back propagated artificial neural networks.

14. The method of claim 10, wherein:
in step (iii), a plurality of proxy surfaces are created, wherein a first proxy surface is created using a Kriging algorithm, a second proxy surface is created using splines, and a third proxy surface is created using back propagated artificial neural networks; and
in step (iv), a plurality of new parent models are selected based upon a local minimum from each of the proxy surfaces.

15. The method of claim 1, further comprising:
(e) producing a display responsive to the forecasted production of the reservoir.

16. The method of claim 1, further comprising:
(e) optimizing hydrocarbon production from the reservoir by modifying a surface facility operation associated with the reservoir responsive to the forecasted production of the reservoir.

17. The method of claim 1, wherein steps (a)-(d) are performed with a fluid flow simulator.

18. A method for forecasting production from a hydrocarbon producing reservoir, the method comprising:
(a) defining an objective function, characteristics of a history-matched model of a reservoir and acceptable error E;
(b) creating at least one geological realization of the reservoir representing a probable geological setting using the characteristics of the history-matched model of the reservoir;
(c) for each geological realization, using a global optimization technique associated with the objective function to perform history matching by determining the difference between observed data obtained from the reservoir and simulated data in a series of iterative steps to obtain acceptable models that are within acceptable error E, the global optimization technique employing:
(i) creating an initial population of parent models having discrete sets of parameters;
(ii) running simulations on, and calculating errors E for, the parent models; and
(iii) creating a plurality of proxy surfaces based on the discrete sets of parameters and errors E associated with the parent models; and
(iv) utilizing the plurality of proxy surfaces to at least one of:
(1) selecting parent models from minimums of the proxy surfaces; and
(2) utilizing the proxy surfaces as filters for selecting offspring models prepared from the parent models and selecting acceptable reservoir models from the offspring models; and
(d) forecasting production of the reservoir based upon simulation runs of the acceptable models.

19. The method of claim 18, wherein in step (iii), each proxy surface is created using one of a Kriging algorithm, splines, and back propagated artificial neural networks.

20. The method of claim 18, wherein:
in step (iii), a first proxy surface is created using a Kriging algorithm, a second proxy surface is created using splines, and a third proxy surface is created using back propagated artificial neural networks; and
in step (iv), a plurality of new parent models are selected based upon a local minimum from each of the proxy surfaces.

21. The method of claim 18, further comprising:
(e) producing a display responsive to the forecasted production of the reservoir.

22. The method of claim 18, further comprising:
(e) optimizing hydrocarbon production from the reservoir by modifying a surface facility operation associated with the reservoir responsive to the forecasted production of the reservoir.

23. The method of claim 18, wherein steps (a)-(d) are performed with a fluid flow simulator.

24. A method for forecasting production from a hydrocarbon producing reservoir, the method, comprising:
(a) defining an objective function, characteristics of a history-matched model of a reservoir and acceptable error E;
(b) creating at least one geological realization of the reservoir representing a probable geological setting using the characteristics of the history-matched model of the reservoir;
(c) for each geological realization, using a global optimization technique associated with the objective function to perform history matching by determining the difference between observed data obtained from the reservoir and simulated data in a series of iterative steps to obtain acceptable models that are within acceptable error E, the optimization technique employing:
(i) creating an initial population of parent models having discrete sets of parameters;
(ii) running simulations on, and calculating errors E for, the parent models; and
(iii) determining whether the parent models have converged to a predetermined acceptability criteria, accepting the parent models as acceptable models when the parent models have converged to meet the predetermined acceptability criteria and proceeding to step (d), when the parent models have not converged to meet the predetermined acceptability criteria proceeding to step (iv);
(iv) creating a proxy surface based upon the parameters and errors E associated with the parent models;
(v) preparing a set of offspring models from the parent models; and
(vi) determining whether the proxy surface passes a test for proxy goodness according to predetermined criteria; and
(d) forecasting production of the reservoir based upon simulation runs of the acceptable models.

25. The method of claim 24, wherein:
when the proxy surface fails to pass the test for proxy goodness according to predetermined criteria in step (vi), step (c) further comprises repeating steps (ii)-(iii) while substituting the offspring models for the parent models; and when the proxy surface passes the test for proxy goodness according to predetermined criteria in step (vi), step (c) further comprises: determining an offspring error E associated with the offspring models and retaining offspring models which satisfy a predetermined error criteria $E_c$; and repeating steps (ii)-(iii) while substituting the retained offspring models for the parent models.

26. The method of claim 24, further comprising:
(e) producing a display responsive to the forecasted production of the reservoir.

27. The method of claim 24, further comprising:
(e) optimizing hydrocarbon production from the reservoir by modifying a surface facility operation associated with the reservoir responsive to the forecasted production of the reservoir.

28. The method of claim 24, wherein steps (a)-(d) are performed with a fluid flow simulator.

29. A method for forecasting production from a hydrocarbon producing reservoir, the method comprising:
(a) creating at least one geological realization of the reservoir representing a probable geological setting;
(b) using a global optimization technique for the at least one geological realization to perform history matching and obtain at least one acceptable model, the global optimization technique comprising:
(i) creating an initial population of parent models having discrete sets of parameters;
(ii) running simulations on, and calculating errors E for, the parent models; and
(iii) determining whether the parent models have converged to a predetermined acceptability criteria, if the parent models have converged to the predetermined acceptability criteria then proceeding to step (c), if the parent models have not converged to the predetermined acceptability criteria then performing the following:
creating a proxy surface based upon the discrete sets of parameters and errors E associated with the parent models; and
determining whether the proxy surface passes a test for proxy goodness by:
calculating proxy error $E_p$ values associated with the proxy surface for a subset of the parent models; and
checking for a difference between the proxy error $E_p$ values and the error E values calculated during the simulation runs of step (ii) for one or more missing parent models omitted from the subset of the parent models used to calculate the proxy error $E_p$ values;
wherein the proxy surface fails the proxy goodness test when the difference is greater than a predetermined value, and the proxy surface passes the proxy goodness test when the difference is less than the predetermined value; and
(c) forecasting production of the reservoir based upon a simulation run of the at least one acceptable model.

30. The method of claim 29, wherein when the proxy surface passes the proxy goodness test performing the following:

preparing a set of offspring models from the parent models;
determining an offspring error E value associated with each of the offspring models;
updating the parent models with the offspring models associated with an offspring error E value less than a predetermined error criteria $E_c$; and
repeating steps (ii)-(iii).

31. The method of claim 29, wherein when the proxy surface fails the proxy goodness test performing the following:
preparing a set of offspring models from the parent models;
updating the parent models with the set of offspring models; and
repeating steps (ii)-(iii).

32. A method for forecasting production from a hydrocarbon producing reservoir, the method comprising:
(a) creating at least one geological realization of the reservoir representing a probable geological setting;
(b) using a global optimization technique for the at least one geological realization to perform history matching and obtain at least one acceptable model, the global optimization technique comprising:
(i) creating an initial population of parent models having discrete sets of parameters;
(ii) running simulations on, and calculating errors E for, the parent models;
(iii) creating a proxy surface based upon the discrete sets of parameters and the calculated errors E;
(iv) selecting a new parent model based upon the proxy surface;
(v) running simulations on the new parent model and calculating a parent model error $E_{PM}$;
(vi) if the new parent model is not within a predetermined error E, retaining the initial population of parent models for use in step (vii), if the new parent model is within the predetermined error E, then updating the initial population of parent models with the new parent model for use in step (vii), and
(vii) repeating steps (iv)-(vi) until the initial population of parent models or the updated population of parent models with the new parent model from step (vi) converge to meet a predetermined acceptability criteria; and
(c) forecasting production of the reservoir based upon a simulation run of the at least one acceptable model.

33. The method of claim 32, wherein in step (iii), the proxy surface is created using a Kriging algorithm.

34. The method of claim 32, wherein in step (iii), the proxy surface is created using splines.

35. The method of claim 32, wherein in step (iii), the proxy surface is created using back propagated artificial neural networks.

36. The method of claim 32, wherein:
in step (iii), a plurality of proxy surfaces are created, the plurality of proxy surfaces comprising a first proxy surface created using a Kriging algorithm, a second proxy surface created using splines, and a third proxy surface created using back propagated artificial neural networks; and
in step (iv), a plurality of new parent models are selected based upon local minimums from the plurality of proxy surfaces.

* * * * *